United States Patent [19]
Kuo

[11] Patent Number: 5,418,637
[45] Date of Patent: May 23, 1995

[54] CASCADED DISTORTION COMPENSATION FOR ANALOG OPTICAL SYSTEMS

[75] Inventor: Chien-Yu Kuo, Wescosville, Pa.
[73] Assignee: AT&T Corp., Murray Hill, N.J.
[21] Appl. No.: 243,610
[22] Filed: May 16, 1994

Related U.S. Application Data

[63] Continuation of Ser. No. 964,317, Oct. 21, 1992, abandoned.
[51] Int. Cl.$^6$ ............... H04B 10/00; H04B 10/04; H04B 10/06
[52] U.S. Cl. ............... 359/161; 359/180; 359/189; 359/188; 359/195
[58] Field of Search ............... 359/161, 173, 180, 188, 359/189, 194, 195

[56] References Cited

U.S. PATENT DOCUMENTS

| | | | |
|---|---|---|---|
| 4,992,754 | 2/1991 | Blauvelt et al. | 330/149 |
| 5,134,621 | 7/1992 | Marshall | 359/181 |

FOREIGN PATENT DOCUMENTS

| | | | |
|---|---|---|---|
| 0475376 | 3/1992 | European Pat. Off. | 359/161 |
| 0521341 | 1/1993 | European Pat. Off. | 359/161 |
| 0524758 | 1/1993 | European Pat. Off. | 359/161 |
| 0081824 | 4/1987 | Japan | 359/161 |
| 2022964 | 12/1992 | WIPO | 359/161 |

OTHER PUBLICATIONS

"Linearization of Broadband Optical Transmission Systems by Adaptive Predistortion", *FREQUENZ*, 38 (1984) 9, Manfred Bertelsmeier and Willmut Zschunke, pp. 206 through 212.

"Dispersion Compensation by Active Predistored Signal Synthesis", *Journal of Lightweight Technology*, vol. LT-3, No. 4, Aug. 1985, Thomas L. Koch and Rod C. Alferness, pp. 800 through 805.

"Compensation of Fibre Chromatic Dispersion in Optical Heterodyne Detection", *Electronic Letters*, 21 Jan. 1988, vol. 24, No. 2, N. Takachio, K. Iwashita, pp. 108 and 109.

"Chromatic Dispersion Compensation in Coherent Optical Communications", *Journal of Lightwave Technology*, vol. 8, No. 3, Mar. 1990, Katsushi Iwashita, Noboru Tikachio, pp. 367 through 375.

"Generation and Cancellation of Second-Order Harmonic Distortion in Analog Optical Systems by Interferometric FM-AM Conversion", *IEEE Photonoics Technology Letters*, vol. 2, No. 7, Jul. 1990, Anne Lidgard and N. A. Olsson, pp. 519 through 521.

"Dispersion-Induced Composite Second-Order Distortion at 1.5 μm", *IEEE Photonics Technology Letters*, vol. 3, No. 1, Jan. 1991, E. E. Bergmann, C. Y. Kuo and S. Y. Huang, pp. 59 through 61.

"Electrical Predistortion to Compensate for Combined Effect of Laser Chirp and Fibre Dispersion", *Electronics Letters*, 28 Feb. 1994, vol. 27, No. 5, H. Gysel, M. Ramachandran, pp. 421 through 423.

Thomas E. Darcie and George E. Bodeep, *Lightwave Subcarrier CATV Transmission Systems*, IEEE Transactions on Microwave Theory and Techniques, vol. 38, No. 5, May 1990.

Straus, "Linearized Transmitters for Analog Fiber Links", Laser Focus, Oct. 1978, vol. 14, #10, pp. 54–62.

*Primary Examiner*—Leslie Pascal
*Attorney, Agent, or Firm*—Wendy W. Koba

[57] ABSTRACT

A cascaded distortion compensation arrangement is disclosed which utilizes a plurality of pre-distortion components disposed in a series arrangement at the input to the transmitter and a plurality of post-distortion components disposed in a series arrangement at the output of the receiver. The various components may be modified, added and/or deleted to provide an arrangement suitable for the particular system.

9 Claims, 1 Drawing Sheet

CASCADED DISTORTION COMPENSATION FOR ANALOG OPTICAL SYSTEMS

This application is a continuation of application Ser. No. 07/964,317, filed on Oct. 21, 1992, now abandoned.

BACKGROUND OF THE INVENTION

1. Technical Field

The present invention relates to cascaded distortion compensation for analog optical systems and, more particularly, to an arrangement using a series connection of a plurality of separate pre- and/or post-distortion compensation components, each component capable of providing specific functionality.

2. Description of the Prior Art

A growing area for analog optical communication systems is the common antenna television (CATV) network. In particular, recent advances in long wavelength distributed feedback (DFB) laser technology have made possible the transport of multiple CATV channels over one single mode fiber at $\lambda = 1.3$ $\mu$m. See, for example, "Lightwave subcarrier CATV transmissions systems", by T. E. Darcie et al. appearing in *IEEE Trans. Microwave Theory Tech.*, Vol. MTT-38, p. 524, 1990. The low levels of analog distortions and noise from the DFB lasers have been found to satisfy the system requirements such that the presence of many channels over a common communication path does not noticeably affect the reception of any particular channel.

It has been well documented, however, that nonlinearities of the DFB laser affect the composite second order (CSO) distortion of the system. Pre-distortion circuits have been developed to compensate for the laser nonlinearity, one exemplary arrangement being disclosed in U.S. Pat. No. 4,992,754 issued to H. A. Blauvelt et al. In this particular arrangement, the distortion is compensated by applying a pre-distorted signal equal in magnitude and opposite in sign to the distortion introduced by the DFB laser. The input signal is split into two paths with the primary part of the signal applied directly to the device, including a time delay to compensate for delays in the secondary path. A pre-distorter in the secondary path generates harmonic signals, the amplitude of which are adjusted to match the amplitude of the distortion. A tilt adjustment is made to compensate the amplitude of the pre-distortion for the frequency dependence of distortion. A fine adjust of the delay is also included so that the phase of the predistortion signal is properly related to the phase of the primary signal.

Additional sources of nonlinearities not discussed in the Blauvelt et al. reference, for example, the interaction of FM chirp intrinsic to a DFB laser with fiber dispersion, can also affect the system performance, as discussed in the article "Dispersion-Induced Composite Second-Order Distortion at 1.5 $\mu$m", by E. E. Bergmann et al. appearing in *IEEE Photonics Tech. Lett.*, Vol. 3, No. 1, January 1991, at p. 59. As discussed in the Bergmann et al. reference, dispersion nonlinearity can be counteracted by utilizing dispersion-shifted fiber, reducing laser chirp, or limiting applications to relatively short spans (e.g., <3 km). Exemplary predistortion compensation for this combination is discussed in an article entitled "Electrical predistortion to Compensate for Combined Effect of Laser Chirp and Fibre Dispersion", by H. Gysel et al. appearing in *Electronic Letters*, Vol. 27, No. 5 at pp. 421–3. Gysel et al. discusses the utilization of a varactor diode/inductor combination to "build in" the inverse of the expected distortion in the signal as applied to the optical transmitting device.

Recently, doped fiber amplifiers have become available which can be used in a CATV network to significantly increase the link loss budget. In particular, the erbium doped fiber amplifier (EDFA) is an attractive component since it exhibits high saturated output power, polarization independent amplification, and low intrinsic optical noise. The high saturated output power of an EDFA is of particular importance to CATV transport and distribution applications. Furthermore, its saturated gain characteristic does not respond to input signal variations at speeds faster than a few kilohertz because of the small absorption and stimulated emission cross sections, as well as the long metastable lifetime of the erbium ions. However, when an EDFA is used to amplify an analog optical AM CATV multiple carrier signal from a directly modulated DFB laser, an increase in the system distortion is observed.

In general, the combination of the above-noted dispersion sources, along with other nonlinear components contained within the communication system, such as external modulators and/or erbium-doped fiber amplifiers, results in an overall system-based nonlinear effect which may distort the system performance. Prior art compensation techniques, which address distortion at the component level (i.e., prior to installation in a communication system), cannot provide adequate compensation for the overall analog communication system.

Thus, a need exists for reducing the signal distortion attributed to the system-level nonlinearity present within an operating analog optical communication system.

SUMMARY OF THE INVENTION

The need remaining in the prior art is addressed by the present invention which relates to cascaded distortion compensation for analog optical systems and, more particularly, to an arrangement using a series connection of a plurality of separate pre- and/or post-distortion compensation components.

In accordance with an exemplary embodiment of the present invention, a distortion compensation arrangement comprises a plurality of series cascaded pre-distortion compensation components (each component configured to compensate for a particular type of system distortion present at a transmitter) and a plurality of series cascaded post-distortion compensation components (each component configured to compensate for a particular type of system distortion present at a receiver). The input signal i(t) thus passes in series through each compensation component such that all distortion is essentially canceled.

In one arrangement, the pre-distortion components may include a first component for compensating laser-based intrinsic distortion and a second component for compensating distortion associated with an optical amplifier and/or external modulator located at the transmitter. The post-distortion components may include a first component for compensating transmission fiber dispersion distortion and a second component for compensating higher-order (e.g., composite triple beat) distortion.

An advantage of the cascaded series arrangement of the present invention is the modularity of the arrangement wherein the individual compensation components are independent correction factors and may be added to or deleted from an individual analog communication system as necessary. In general, the system may be "field programmable" in that the system user may adjust the types and degree of compensation associated with each compensation component, in accordance with changes in system requirements.

Other and further advantages of the present invention will be apparent during the course of the following discussion and by reference to the accompanying drawings.

BRIEF DESCRIPTION OF THE DRAWINGS

Referring now to the drawings, where like numerals represent like components.

DETAILED DESCRIPTION

Figure 1:
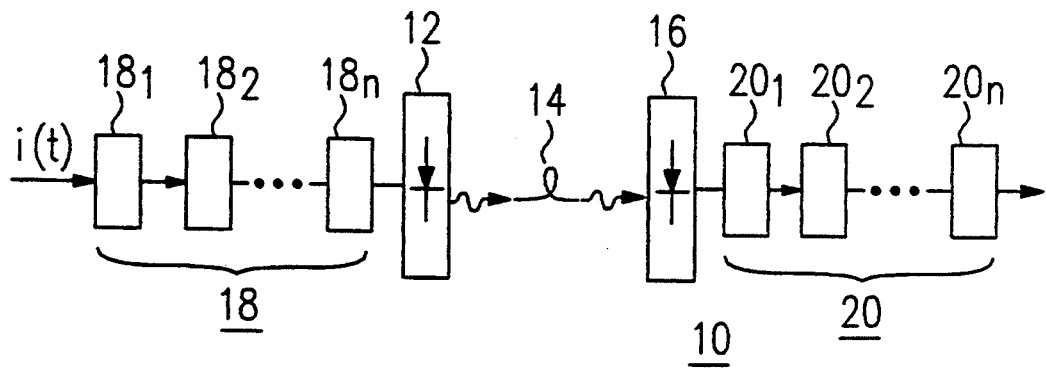
FIG. 1 illustrates an exemplary analog optical communication system utilizing the cascaded series distortion compensation arrangement of the present invention.

FIG. 1 illustrates an generalized block diagram of an exemplary analog optical communication system 10 utilizing cascaded series distortion compensation in accordance with the teachings of the present invention. In general, system 10 comprises a laser transmitter 12 which is utilized to form an optical communication signal which propagates over optical fiber 14 to an optical receiver 16 (e.g., PIN-FET receiver). In accordance with the teachings of the present invention a plurality of n pre-distortion compensation components 18 are disposed in a cascaded series arrangement before the input to laser transmitter 12. A plurality of N post-distortion compensation components 20 are illustrated in FIG. 1 as disposed in a cascaded series arrangement after the output of receiver 16 (where n may or may not be equal to N). In operation, an electrical (RF) message signal i(t) is applied as an input to the series arrangement of pre-distortion components 18 and is modified as it passes therethrough to provide at the output thereof a pre-distorted input signal $i'' \ldots '(t)$. Pre-distorted signal $i'' \ldots '(t)$ is then applied as an input to transmitter 12 which then generates an optical signal which is sufficiently pre-distorted so as to be essentially linear over the bandwidth of interest. The optical signal subsequently propagates along optical fiber 14 and is applied as an input to optical receiver 16. Optical receiver 16, which may comprise a PIN-FET receiver, then converts the optical signal into an electrical representation I(t). Electrical signal I(t), as converted, contains distortions introduced both by optical fiber 14 (chromatic dispersion) and optical receiver 16. Post-distortion compensation components 20 are thus coupled to the output of receiver 16 and utilizes to substantially compensate for these distortion elements.

Pre-distortion compensation arrangement 18 comprises a plurality of n separate distortion compensation components $18_1, 18_2, \ldots, 18_n$, where each component is utilized to correct for a different distortion factor associated with laser transmitters. For example, the distortion associated with the laser device itself may be corrected by an exemplary component $18_i$. Various other elements, for example, optical amplifiers and/or external modulators, may be located with the laser transmitter and the distortion associated with these elements compensated as required. Similarly, post-distortion compensation arrangement 20 comprises a plurality of N separate distortion compensation components $20_1, 20_2, \ldots, 20_N$, where each component is utilized to correct for a different distortion factor. dispersion along optical fiber 14 may be compensated by an exemplary component $20_i$.

As mentioned above, an advantage of the series cascaded arrangement of the present invention is the modularity of the arrangement, that is, the ability to modify separate components without disturbing the compensation characteristics of the remaining compensation components. For example, if a different laser source is substituted for transmitter 12, a different distortion compensation component $18_i$ may be substituted. Likewise, if the receiver is moved to a fiber of different length, for example, the post-distortion component $20_i$ associated with compensating fiber dispersion may be altered without adjusting the remaining post-distortion components. Therefore, the arrangement of the present invention may be altered as need be by the user to accommodate changes in the environment of the deployed system.

Figure 2:
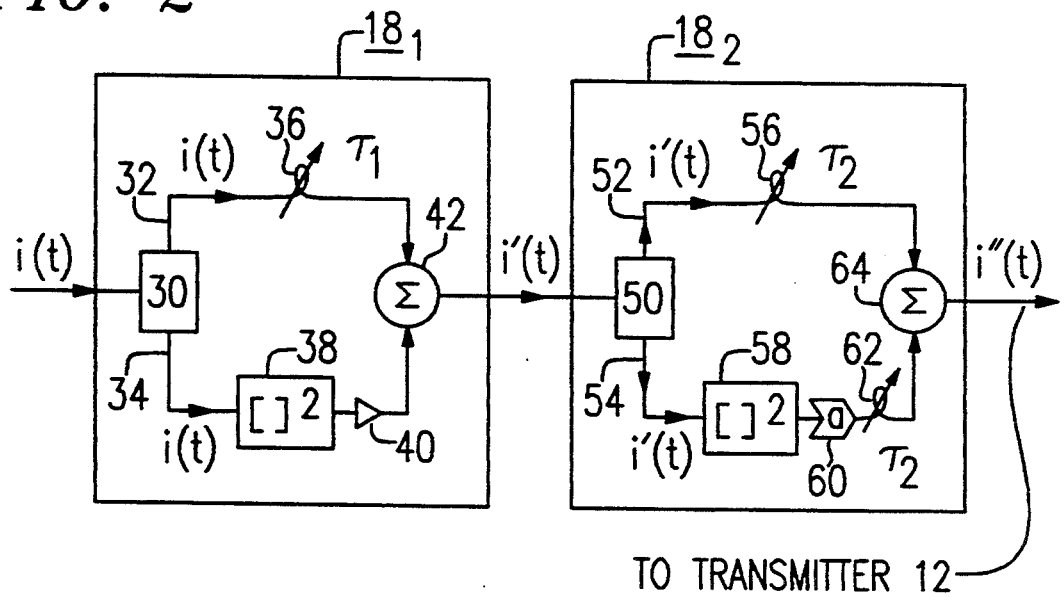
FIG. 2 illustrates an exemplary plurality of cascaded pre-distortion compensation components which may be used with the system illustrated in FIG. 1.

FIG. 2 illustrates an exemplary plurality of n=2 pre-distortion compensation components which may be utilized in system 10 as illustrated in FIG. 1. In particular, a first component $18_1$ is utilized to compensate for the inherent nonlinearities of laser transmitter 12 (FIG. 1). As shown, component $18_1$ includes a splitter 30 which functions to direct the incoming (electrical) signal i(t) along a first signal path 32 and a second signal path 34. First signal path 32 includes delay means 36 which functions to provide a time delay $\tau_1$ to signal i(t) which is substantially identical to the delay associated with second signal path 34. Second signal path 34 includes a compensation element 38, for example, a signal squarer, which essentially duplicates (in amplitude, phase and frequency) the particular nonlinearity associated with transmitter 12. The details of such a compensation scheme are well-known in the art and need not be discussed here. The output from element 38 is subsequently inverted in magnitude within an inverter 40. A summing element 42 is then used to add the original (delayed) signal to the distortion compensation signal to form a first distortion compensated signal i'(t).

As mentioned above, another influence on system nonlinearity may be attributed to the presence of a doped fiber amplifier which is co-located with transmitter 12 (not shown). The contribution to the composite second order (CSO) distortion from such an amplifier has been found to result from inadvertent FM to AM conversion within the doped region of the fiber amplifier. Alternatively, the utilization of a external modulator with the laser transmitter 12 may form a similar type of distortion. In either case, when a laser source is directly modulated through injection current, its optical frequency varies likewise. When this frequency modulated signal passes through a fiber amplifier (or external modulator), which has wavelength dependent gain $G(\nu)$, the signal experiences unwanted amplitude modulation, which is then superimposed upon the desired amplitude modulation of the input signal. Therefore, the effective L-I curve from the combination of the laser and amplifier (or modulator) is either super-linear or sub-linear, thus resulting in the unwanted second order distortion. The second order distortion, denoted 2HD, related to the presence of a doped fiber amplifier can be represented as:

$$2HD = \frac{\frac{\partial G}{\partial \nu} \frac{d\nu}{dI} I_m}{G(p, \nu_o)},$$

where $\partial G/\partial \nu$ is defined as the slope of the doped fiber amplifier curve, $d\partial/dI$ is the frequency chirp, $I_m$ is the amplitude of the modulation current, and $G(p,\nu_o)$ is defined as the time invariant gain. The CSO distortion related to the second order distortion of the j-th channel of a CATV system can be expressed as follows:

$$CSO_j = c_j[2HD]^2.$$

The CSO distortion attributed to such amplifiers as described above may be corrected using a pre-distortion component $18_2$, as shown in FIG. 2. In particular, component $18_2$ is responsive to the first pre-distorted signal i'(t) output from first pre-distortion component $18_1$. As shown, second pre-distortion component $18_2$ includes a splitter 50 for providing pre-distorted signal i'(t) along a pair of signal paths 52 and 54. Signal path 52 contains a delay element 56 for provide a predetermined time delay $\tau_2$ which essentially equals the time delay along second signal path 54. Second signal path 54 contains a squaring element 58, an attenuator 60 and time delay means 62 to form a distortion signal of the form $ai^k(t-\tau_2)$. A summing element 64 is used to add this distortion signal to the first (delayed) distortion signal i'(t) along path 52 to form a second pre-distorted signal i''(t). Signal i''(t) may then be subsequently applied as the input to laser transmitter 12 of FIG. 1. As mentioned above, various other pre-distortion components may be added to those described above.

Figure 3:
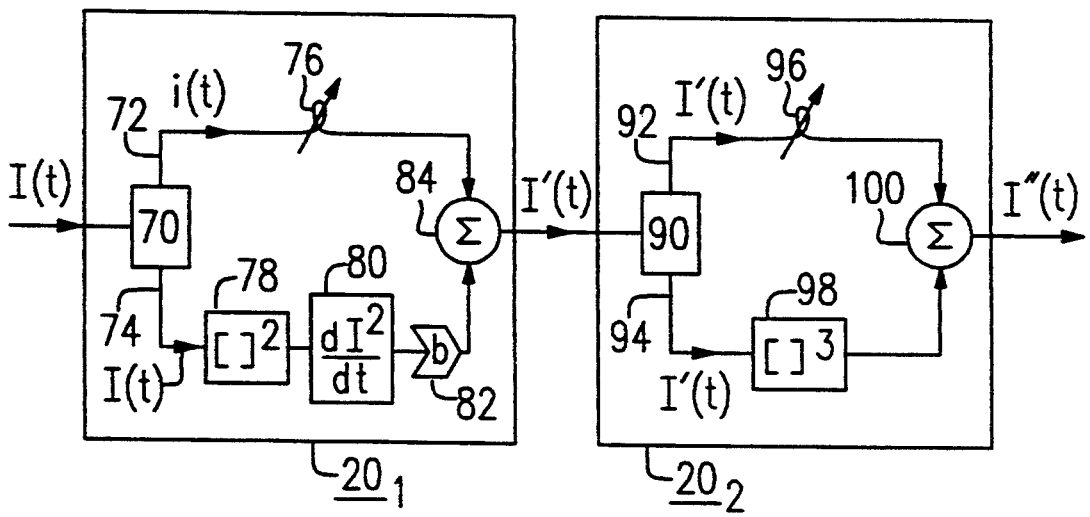
FIG. 3 illustrates an exemplary plurality of cascaded post-distortion compensation components which may be used with the system illustrated in FIG. 1.

FIG. 3 illustrates an exemplary plurality of N=2 post-distortion elements $20_1$ and $20_2$. As discussed above, another source of distortion in analog optical communication system 10 is the chromatic dispersion introduced by optical fiber 14. Studies have indicated that the CSO becomes increasingly large as the length of the fiber increases, and also as the channel frequency increases. Additionally, it has been found that the CSO is worse for lasers with larger chirp. Theoretically, the CSO attributed to the laser chirp-fiber dispersion combination for a particular channel "j" can be represented as follows:

$$CSO_j \approx \frac{b^2}{g^2} c_j \omega_j^2 \frac{m^2 p^2}{\left(\frac{dp}{dI}\right)^2}, \text{ where}$$

$$b = \alpha_s DL \frac{d\nu}{dI} \frac{dp}{dI} \frac{\lambda^2}{c}, \text{ and}$$

$$g = \alpha_s \frac{dp}{dI}, \text{ where}$$

$c_j$ is the number of CSO components, $\omega_j$ is the angular frequency at which distortion occurs, m is the modulation index, p is the average optical power, dp/dI is the optical slope efficiency, $\alpha_s$ is the system attenuation, D is the fiber dispersion, L is the fiber length, $d\nu/dI$ is the laser chirp, $\lambda$ is the average signal wavelength, and c is the speed of light.

First post-distortion compensation component $20_1$, as illustrated in FIG. 3, may be utilized to compensate for the chromatic dispersion described above. In particular, component $20_1$ includes a signal splitter 70 which receives as an input the electronic output signal I(t) from optical receiver 16 (FIG. 1). The output from splitter 70 is subsequent inserted along a first signal path 72 and second signal path 74. Similar to the pre-distortion components discussed above in association with FIG. 2, first signal path 72 includes a delay means 76 for providing an equalizing time delay $\tau_1$ with second signal path 74. As shown, second signal path 74 includes a number of elements which are utilized to compensate for chromatic dispersion. In particular, second signal path 74 includes a squaring means 78, which is utilized to form the second harmonic of the signal, and a differentiator 80, used to form the j-th derivative of the signal, where in the case of fiber dispersion correction, the first derivative is utilized. An attenuator 82 is disposed in second signal path 74 and may be adjusted by the user to provide the correct level of distortion compensation. The output from second signal path 74 is defined by the term $$b \frac{dI^2(t - \tau_b)}{dt},$$

assuming the first derivative signal is used. This distortion compensation signal is subsequently summed with the signal I(t) propagating along first signal path 72 within a summing element 84 to form as an output a first post-distortion signal I'(t).

A second post-distortion compensation component $20_2$, disposed at the output of first component $20_1$, may be used to provide higher-order correction factors to the received signal. For example, this component may be used to compensate for composite triple beat (CTB) distortion. In particular, component $20_2$ may comprise a signal splitter 90, responsive to first post-distorted signal I'(t), for providing this signal along a pair of signal paths 92 and 94, where first path 92 includes delay means 96. Second signal path 94 contains a compensation element 98 which functions to form a cubed representation of the applied signal. A summing element 100 is used to combine the signals propagating along paths 92 and 94, thus forming as an output a second post-distorted signal I''(t).

It is to be understood that the embodiments described above are exemplary only, and any desired pre- and/or post-distortion compensation component may be used in the cascaded series arrangement of the present invention. As mentioned above, an advantage of the cascaded series arrangement of the present invention is the ability to modify, add and/or delete the various pre- and post-distortion components as the system needs change.

I claim:

1. An analog optical communication system comprising
    an optical signal source, responsive to an electronic input signal for providing an analog optical output signal;
    an optical signal path coupled to the output of the optical signal source; and
    an optical receiver coupled to the optical signal path for recovering therefrom the electronic input signal from said optical signal source, wherein the analog optical communication system comprises elements, including but not limited to the signal source, the signal path and the receiver, which generate distortion
CHARACTERIZED IN THAT
the system further comprises
a plurality of cascaded series distortion compensation components, each component configured to substantially compensate for a separate and distinct predefined distortion and associated in a one-to-one relationship with the distortion generated by the system elements, said plurality of cascaded series distortion compensation components disposed at either the input to the optical signal source so as to provide a pre-distorted electronic input signal or the output of the optical receiver to provide post-distortion compensation to the recovered electrical signal.

2. An analog optical communication system as defined in claim 1 wherein the plurality of distortion compensation components comprises
a plurality of pre-distortion compensation components disposed in a cascaded series arrangement at the input to the optical signal source so as to provide a pre-distorted electronic input signal to said optical signal source.

3. An analog optical communication system as defined in claim 2 wherein the plurality of pre-distortion compensation components are utilized to compensate for inherent laser distortion and distortion associated with nonlinearities of elements contained within the laser transmitter.

4. An analog optical communication system as defined in claim 3 wherein a pre-distortion compensation component is chosen to provide compensation for a doped fiber amplifier contained within the laser transmitter.

5. An analog optical communication system as defined in claim 3 wherein a pre-distortion compensation component is chosen to provide compensation for an external modulator contained within the laser transmitter.

6. An analog optical communication system as defined in claim 1 wherein the plurality of distortion compensation components comprises
a plurality of post-distortion compensation components disposed in a cascaded series arrangement at the output of the optical receiver so as to provide compensation to the electrical signal recovered therefrom.

7. An analog optical communication system as defined in claim 6 wherein a post-distortion compensation component is chosen to provide compensation for chromatic dispersion associated with the optical signal path.

8. An analog optical communication system as defined in claim 6 wherein a post-distortion compensation component is chosen to provide compensation for the optical receiver.

9. An analog optical communication system as defined in claim 1 wherein the plurality of distortion compensation components comprises
a plurality of pre-distortion compensation components disposed in a a cascaded series arrangement at the input to the optical signal source so as to provide a pre-distorted electronic input signal to said optical signal source; and
a plurality of post-distortion compensation components disposed in a cascaded series arrangement at the output of the optical receiver so as to provide compensation to the electrical signal recovered therefrom.

* * * * *